US011975600B2

(12) United States Patent
Kimura et al.

(10) Patent No.: US 11,975,600 B2
(45) Date of Patent: May 7, 2024

(54) ELECTRIC TRUCK

(71) Applicant: Daimler AG, Stuttgart (DE)

(72) Inventors: Kiyoshi Kimura, Kawasaki (JP); Shigeru Okonogi, Kawasaki (JP)

(73) Assignee: Daimler Truck AG, Leinfelden-Echterdingen (DE)

( * ) Notice: Subject to any disclaimer, the term of this patent is extended or adjusted under 35 U.S.C. 154(b) by 179 days.

(21) Appl. No.: 17/626,388

(22) PCT Filed: Jun. 17, 2020

(86) PCT No.: PCT/JP2020/023704
§ 371 (c)(1),
(2) Date: Jan. 11, 2022

(87) PCT Pub. No.: WO2021/010080
PCT Pub. Date: Jan. 21, 2021

(65) Prior Publication Data
US 2022/0250458 A1    Aug. 11, 2022

(30) Foreign Application Priority Data
Jul. 12, 2019    (JP) .................. 2019-130450

(51) Int. Cl.
*B60K 1/04*    (2019.01)
*B62D 21/03*    (2006.01)

(52) U.S. Cl.
CPC ............... *B60K 1/04* (2013.01); *B62D 21/03* (2013.01)

(58) Field of Classification Search
CPC ........ B62D 21/157; B62D 21/03; B60K 1/04; B60Y 2306/01
See application file for complete search history.

(56) References Cited

U.S. PATENT DOCUMENTS 10,800,457 B2 * 10/2020 Shimizu ............... B60L 53/12
11,584,213 B2 * 2/2023 Spurling ............... B60K 5/12
(Continued)

FOREIGN PATENT DOCUMENTS

CN     103707751 A    4/2014
CN     104995051 A    10/2015
(Continued)

OTHER PUBLICATIONS

JP 2018187976 A machine translation from espacene.tcom (Year: 2023).*
(Continued)

*Primary Examiner* — Paul N Dickson
*Assistant Examiner* — Maxwell L Meshaka
(74) *Attorney, Agent, or Firm* — Crowell & Moring LLP

(57) ABSTRACT

An electric truck that travels by electric power supplied from a battery includes a ladder frame including a pair of side rails, where the side rails face each other in a vehicle width direction, and a power supply unit including the battery, where the power supply unit is disposed between the side rails and is connected to the side rails. The side rails each have flanges having a predetermined width provided at each edge of a respective web. At least one of the flanges at a location facing a corner of the power supply unit as viewed in the vehicle width direction has a narrowed flange portion having a width smaller than the predetermined width.

6 Claims, 10 Drawing Sheets

(56) References Cited

U.S. PATENT DOCUMENTS

| | | | |
|---|---|---|---|
| 11,603,137 B2* | 3/2023 | Eklund | B62D 21/03 |
| 2018/0222304 A1* | 8/2018 | Kaneko | B60K 5/1216 |
| 2019/0016388 A1* | 1/2019 | Shimizu | B60K 1/04 |
| 2020/0122559 A1* | 4/2020 | Spurling | B60K 5/1258 |
| 2022/0063725 A1* | 3/2022 | Woo | B62D 27/023 |
| 2022/0194489 A1* | 6/2022 | Roche | B60K 1/00 |
| 2022/0250458 A1* | 8/2022 | Kimura | B62D 53/02 |
| 2022/0410974 A1* | 12/2022 | Eklund | B62D 21/03 |
| 2023/0102921 A1* | 3/2023 | Odhekar | B62D 21/02 |
| | | | 296/187.12 |

FOREIGN PATENT DOCUMENTS

| | | | |
|---|---|---|---|
| CN | 105936303 A | | 9/2016 |
| JP | H08324453 A | * | 12/1996 |
| JP | 2007-38961 A | | 2/2007 |
| JP | 2014-69686 A | | 4/2014 |
| JP | 2016-113063 A | | 6/2016 |
| JP | 2018-187976 A | | 11/2018 |
| JP | 2019014364 A | * | 1/2019 |
| JP | 2021030947 A | * | 3/2021 |
| JP | 2021075110 A | * | 5/2021 | B60K 1/04 |
| JP | 2021075111 A | * | 5/2021 |
| JP | 2021115964 A | * | 8/2021 |
| JP | 2021120260 A | * | 8/2021 |
| KR | 20170079052 A | * | 7/2017 |
| WO | WO-2022251284 A1 | * | 12/2022 |
| WO | WO-2023021083 A1 | * | 2/2023 |

OTHER PUBLICATIONS

JP 2007038961 A machine translation from espacenet.com (Year: 2023).*

PCT/JP2020/023704, International Search Report dated Aug. 25, 2020 (Two (2) pages).

Chinese Office Action issued in Chinese application No. 202080050989.0 dated Jul. 25, 2023, with partial English translation (Nine (9) pages).

English-language Extended European Search Report issued in European application No. 20841642.0-1012 dated Jun. 16, 2023 (Seven (7) pages).

* cited by examiner

ELECTRIC TRUCK

TECHNICAL FIELD

The present invention relates to an electric truck.

BACKGROUND ART

From a viewpoint of reducing environmental burdens, development of electric vehicles, such as full electric cars using a motor as a power source for propulsion in place of an internal combustion engine and hybrid electric cars using both an internal combustion engine and a motor, has been progressing. In such electric vehicles, a battery for propulsion is mounted to drive the motor, and power required to move the vehicle is obtained by supplying electric power from the battery to the motor. In recent years, also in the field of commercial vehicles such as trucks, development of electric vehicles has been being promoted. For example, Patent Document 1 discloses a holding structure for holding a battery pack for propulsion to a ladder frame of an electric truck.

In order to ensure a sufficient travel range, full electric trucks require mounting of a battery having a large capacity as compared with hybrid electric trucks, etc. In electric trucks, from a viewpoint of ease of securing a space for the battery, it is preferable to arrange the battery between side rails constituting a ladder frame, not on the outer side of either side rail as viewed in the vehicle width direction.

CITATION LIST

Patent Document

[Patent Document 1] Japanese Patent Laid-Open No. 2016-113063

SUMMARY OF THE INVENTION

Problem to be Solved by the Invention

However, side rails for trucks commonly have a C-shaped cross-section by having flanges provided at each edge of a web to project inward in the vehicle width direction. Thus, when the battery is arranged in the aforementioned manner, if a side rail is deformed in a side collision, the battery does not come into surface contact with the web but receives intensive impact from the edge of a flange which comes into contact with a relatively small contact area. Thus, the electric truck with a battery arranged between the side rails forming a pair has a possibility of the battery becoming greatly damaged in a side collision, and thus, cannot ensure side collision safety.

The present invention has been made in view of the above problem. An object of the present invention is to provide an electric truck which can ensure side collision safety of a battery arranged inside the frame.

Arrangement for Solving the Problem

First Aspect of the Invention

A first aspect of the present invention is an electric truck traveling by electric power supplied from a battery, comprising a ladder frame including a pair of side rails, the side rails facing each other in vehicle width direction, and a power supply unit including the battery, the power supply unit being arranged between the side rails and connected to the side rails, wherein the side rails each have flanges having a predetermined width provided at each edge of a web, wherein the flange facing at least one of corners of the power supply device has at least one narrowed flange portion having a width smaller than the predetermined width at a location facing one of the corners of the power supply unit as viewed in the vehicle width direction.

In the electric truck in which the power supply unit including the battery is connected to the side rails forming a pair, the ladder frame has increased rigidity against side impact in the region corresponding to the power supply unit. Meanwhile, the ladder frame has relatively low rigidity at the locations facing corners of the power supply unit as viewed in the vehicle width direction, and thus, when receiving impact exceeding the rigidity in a side collision, the ladder frame may be deformed in a region near a corner of the power supply unit. The side rail thus deformed may give intensive impact to the power supply unit with the edge of a flange which comes into contact with a relatively small contact area, thereby damaging the battery included in the power supply unit.

Thus, in the electric truck according to the first embodiment of the present invention, a narrowed flange portion is provided in the flange of the ladder frame which faces a corner of the power supply unit to reduce the possibility of the side rail coming into contact with the power supply unit even when the side rail is deformed. The electric truck according to the first aspect of the present invention can thus ensure the side collision safety of the battery arranged inside the frame.

Second Aspect of the Invention

A second aspect of the present invention is an electric truck according to the first aspect in which the narrowed flange portions are provided to face two vehicle front-side corners of the power supply unit, respectively.

In the electric truck according to the second aspect of the present invention, the narrowed flange portions are provided at the locations facing the vehicle front-side corners of the power supply unit at which the side rail is most likely to come into contact with the power supply unit when the ladder frame is deformed. The risk of the battery becoming damaged by contact between the side rail and the power supply unit is therefore reduced effectively.

Third Aspect of the Invention

A third aspect of the present invention is an electric truck according to the first or second aspect in which the narrowed flange portions are provided to face two vehicle rear-side corners of the power supply unit, respectively.

In the electric truck according to the third aspect of the present invention, the narrowed flange portions are provided at the locations facing the vehicle rear-side corners of the power supply unit at which the side rail is relatively highly likely to come into contact with the power supply unit when the ladder frame is deformed. The risk of the battery becoming damaged by contact between the side rail and the power supply unit is therefore reduced effectively.

Fourth Aspect of the Invention

A fourth aspect of the present invention is an electric truck according to any of the first to third aspects in which the narrowed flange portion has an arc-shaped outline.

In the electric truck according to the fourth aspect of the present invention in which the narrowed flange portion provided in the flange of the side rail has an arc-shaped outline, stress concentration in the narrowed flange portion is prevented when force is applied to the frame during traveling of the vehicle.

Fifth Aspect of the Invention

A fifth aspect of the present invention is an electric truck according to any of the first to fourth aspects in which the narrowed flange portion is provided such that the most narrowed point at which the narrowed flange portion has the smallest width is in alignment with the corresponding corner of the power supply unit as viewed in the vehicle width direction.

In the electric truck according to the fifth aspect of the present invention in which the power supply unit is arranged with a corner facing the most narrowed point at which the narrowed flange portion has the smallest width, the risk of the power supply unit becoming damaged by contact with the ladder frame is reduced effectively.

MODE OF CARRYING OUT THE INVENTION

With reference to the accompanying drawings, embodiments of the present invention will be described in detail. The present invention is not limited to the description given below; it can be carried out with any desired alteration that does not change the essentials thereof. The drawings used in explanation of the embodiments show components, schematically; in order to help understanding, the drawings may contain partial emphasis, enlargement, contraction, omission or the like, and thus, may not necessarily show the components at an accurate scale and in an accurate shape.

First Embodiment

Figure 1:
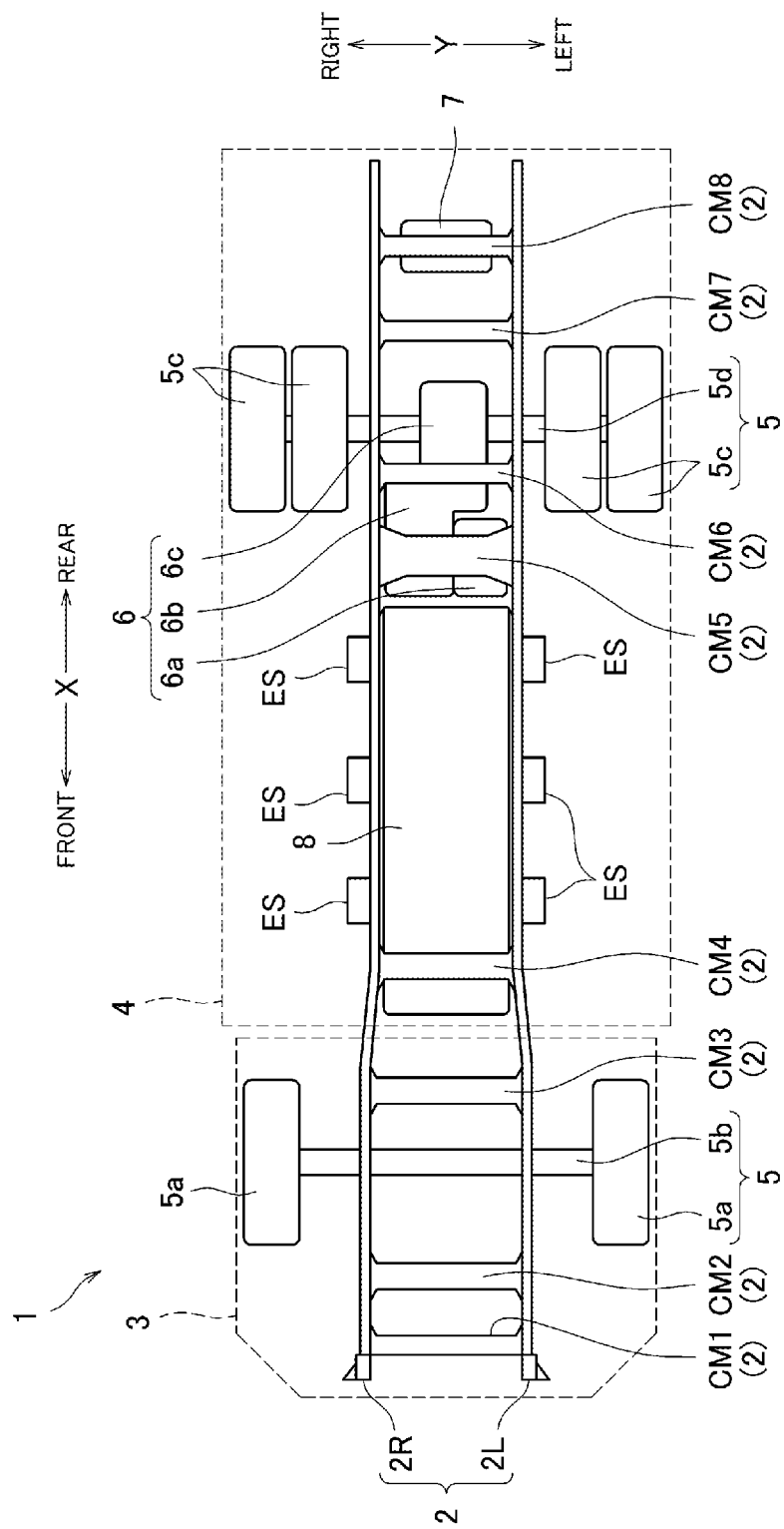
FIG. 1 is a top view schematically showing the total structure of an electric truck according to a first embodiment of the present invention.

FIG. 1 is a top view schematically showing the total structure of an electric truck 1 according to a first embodiment of the present invention. As shown in FIG. 1, the electric truck 1 according to the present embodiment comprises a ladder frame 2, a cab 3, a cargo box 4, wheel mechanisms 5, a drive unit 6, a drive power supply device 7 and a power supply unit 8. FIG. 1 is a top view of the electric truck 1 viewed from the top of the electric truck 1 through the cab 3 and the cargo box 4.

The ladder frame 2 comprises a left and a right side rails 2L, 2R, referred to as "a pair of side rails", and cross-members CM1 to CM8. The left and right side rails 2L, 2R extend in the vehicle longitudinal direction X of the electric truck 1. They are arranged parallel to each other to face each other in the vehicle width direction Y. The cross-members CM1 to CM8 connect the left side rail 2L to the right side rail 2R at their respective positions to form a ladder-shaped frame referred to as a "ladder frame 2". The ladder frame 2 supports the cab 3, the cargo box 4, the drive unit 6, the drive power supply device 7, the power supply unit 8 and other heavy objects mounted on the electric truck 1.

The cab 3 is a structure with a driver's seat, not shown, and arranged over the front of the ladder frame 2. The cargo box 4 is a structure into which cargos to be transported by the electric truck 1 are loaded, and arranged over the rear of the ladder frame 2.

In the present embodiment, the wheel mechanism 5 arranged in the front of the vehicle comprises a left and a right front wheels 5a and a front axle 5b, or shaft for the front wheels 5a, while the wheel mechanism 5 arranged in the rear of the vehicle comprises two left and two right rear wheels 5c and a rear axle 5d, or shaft for the rear wheels 5c. In the electric truck 1 according to the present embodiment, the rear wheels 5c are drive wheels to which drive power is transmitted to move the electric truck 1. The wheel mechanisms 5 are attached to the ladder frame 2 by means of a suspension mechanism, not shown, and support the weight of the electric truck 1.

The drive unit 6 comprises a motor 6a, a speed reducing mechanism 6b and a differential mechanism 6c. By being supplied with AC power from the drive power supply device 7 described later, the motor 6a produces drive power required to move the electric truck 1. The speed reducing mechanism 6b comprises a plurality of gears, not shown, to convert rotational power produced by the motor 6a into a reduced speed and transmit it to the differential mechanism 6c. The differential mechanism 6c distributes the power transmitted from the speed reducing mechanism 6b to the left and right rear wheels 5c. In other words, the drive unit 6 is configured such that drive power produced by the motor 6a is converted into a reduced rotational speed suited for moving the vehicle and transmitted to the rear axle 5d by means of the speed reducing mechanism 6b and the differential mechanism 6c. The drive unit 6 can thus rotate the rear wheels 5c via the rear axle 5d, thereby moving the electric truck 1. In the drive unit 6, a front portion as viewed in the vehicle longitudinal direction X is suspended by the cross-member CM5 attached to the ladder frame 2.

The drive power supply device 7 is an inverter. It converts DC power supplied from the power supply unit 8 into AC power and supplies it to the motor 6a, and controls the rotational speed of the motor 6a according to an accelerator operation performed in the electric truck 1.

The power supply unit 8 comprises a battery 30 (see FIG. 3) which supplies electric power to the motor 6a and thus functions primarily as an energy source for moving the electric truck 1. The power supply unit 8 includes a plurality of battery modules BM of relatively large size and capacity (see FIG. 3) to store electric power required for the electric truck 1. The power supply unit 8 can supply electric power also to auxiliary electric devices, not shown, mounted on the electric truck 1 via a PDU 20, described later. The configuration of the power supply unit 8 will be described later in detail.

In the present embodiment, the ladder frame 2 has a plurality of elastic supports ES to elastically support the power supply unit 8 in the vehicle width direction Y at the opposite sides. Specifically, three elastic supports ES are provided on the outer side of the left side rail 2L and on the outer side of the right side rail 2R, each (six in total), as viewed in the vehicle width direction Y. The number of the elastic supports ES may however be appropriately changed depending on the weight and size of the power supply unit 8. The configuration of the elastic support ES will be described later in detail.

Figure 2:
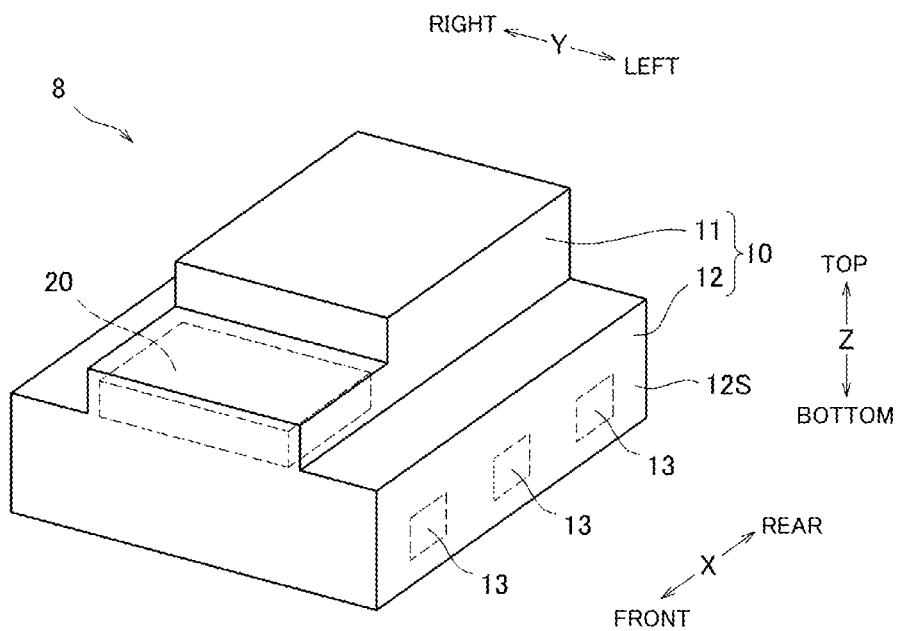
FIG. 2 is a perspective view showing the general shape of a power supply unit mounted on the electric truck.

FIG. 2 is a perspective view showing the general shape of the power supply unit 8 mounted on the electric truck 1. In the present embodiment, the power supply unit 8 comprises a battery housing 10, a PDU 20 and a battery 30 comprising a plurality of battery modules BM (omitted in FIG. 2; see FIG. 3).

The battery housing 10 comprises a first battery housing portion 11 and a second battery housing portion 12 combined together, where the first and second battery housing portions are in the shape of a roughly rectangular solid and have the same length, or dimension measured in the vehicle longitudinal direction X. As viewed in the vehicle longitudinal direction X, the first battery housing portion 11 has a low-height portion in the front, in which the PDU 20 is enclosed. The battery housing 10 is thus shaped not to interfere with the cross-member CM4. Arranging the first battery housing portion 11 such that the PDU 20 enclosing portion is, between the side rails, in alignment with the cross member CM4 as viewed in the vehicle height direction Z enables effective use of space, and thus, contributes to maximizing the space to be occupied by the battery 30.

The first battery housing portion 11 has a width, or dimension measured in the vehicle width direction Y allowing it to be located between the left and right side rails 2L, 2R. Meanwhile, the second battery housing portion 12 has a width, or dimension measured in the vehicle width direction Y equal to or greater than the width of the ladder frame 2. The second battery housing portion 12 is joined to the first battery housing portion 11 from below, as viewed in the vehicle height direction Z.

The battery housing 10 has thus an inverted T-shaped cross-section perpendicular to the vehicle longitudinal direction X. The battery housing 10 is arranged such that the left and right side rails 2L, 2R extend over the steps formed due to the difference in width between the first and the second battery housing portions 11, 12. This arrangement makes it possible to secure the battery capacity by making effective use of a space between the left and right side rails 2L, 2R and a space below it.

For connecting the elastic supports ES, the battery housing 10 has a plurality of fixing regions 13 on the housing sides 12S, or outer side surfaces of the second battery housing portion 12 as viewed in the vehicle width direction Y.

The PDU 20 is a power distribution unit which collects electric power from the battery modules BM and distributes part of the collected electric power to the auxiliary electric devices via a harness (not shown). Although in the present embodiment the PDU 20 is enclosed in the battery housing 10 with the battery 30, in some layout of components between the side rails it may be arranged outside the battery housing 10.

Figure 3:
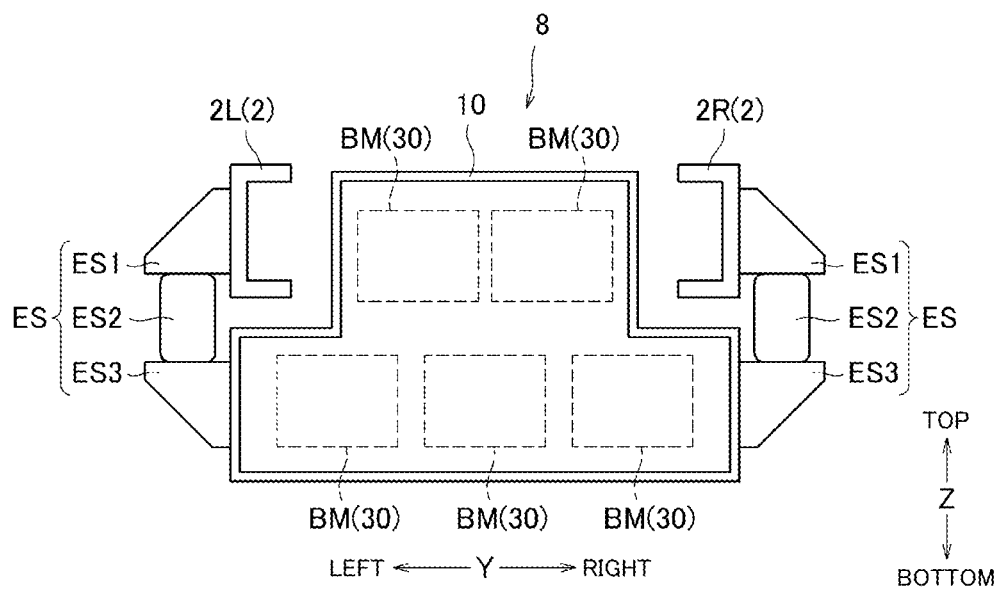
FIG. 3 is a cross-sectional view showing the configuration and connecting manner of an elastic support for connecting the power supply unit to a ladder frame.

FIG. 3 is a cross-sectional view showing the configuration and connecting manner of the elastic support ES for connecting the power supply unit 8 to the ladder frame 2. More specifically, FIG. 3 is a cross-sectional view showing the cross-sections of the power supply unit 8 and the elastic support ES perpendicular to the vehicle longitudinal direction X viewed from the rear of the vehicle.

The power supply unit 8 includes a plurality of battery modules BM, where the number of the battery modules BM depends on the size of the battery housing 10. The shape and arrangement of the battery modules BM may be changed in various ways.

The elastic support ES comprises a frame-side bracket ES1, an elastic connector ES2 and a battery-side bracket ES3. The frame-side bracket ES1 is a fixing member of metal. It is bolted to the outer side of the left or right side rail 2L, 2R as viewed in the vehicle width direction Y. As viewed in the vehicle height direction Z, the elastic connecter ES2 is connected to the frame-side bracket ES1 by means of a rubber bush on the upper side, and connected to the battery-side bracket ES3 on the lower side. The battery-side bracket ES3 is a fixing member of metal and fixed to the battery housing 10 in the above-mentioned fixing region 13.

The elastic supports ES thus elastically attach the power supply unit 8 to the ladder frame 2, and even when stress is produced by twist or lateral bend of the frame during traveling of the electric truck 1, reduce the stress transmitted to the power supply unit 8 by their damping effect. The risk that that the battery 30 included in the power supply unit 8 will be damaged by the stress is therefore reduced.

Meanwhile, for the left and right side rails 2L, 2R, this means that they are elastically connected to each other by means of the elastic supports ES connected to each rail and the battery housing 10 constituting the power supply unit 8. The plurality of elastic supports ES thus increases the rigidity of the ladder frame 2 by connecting the side rails to each other in cooperation with the power supply unit 8, while reducing the stress applied due to twist or lateral bend of the frame. The plurality of elastic supports thus fulfills the same function as the cross-member.

Figure 4:
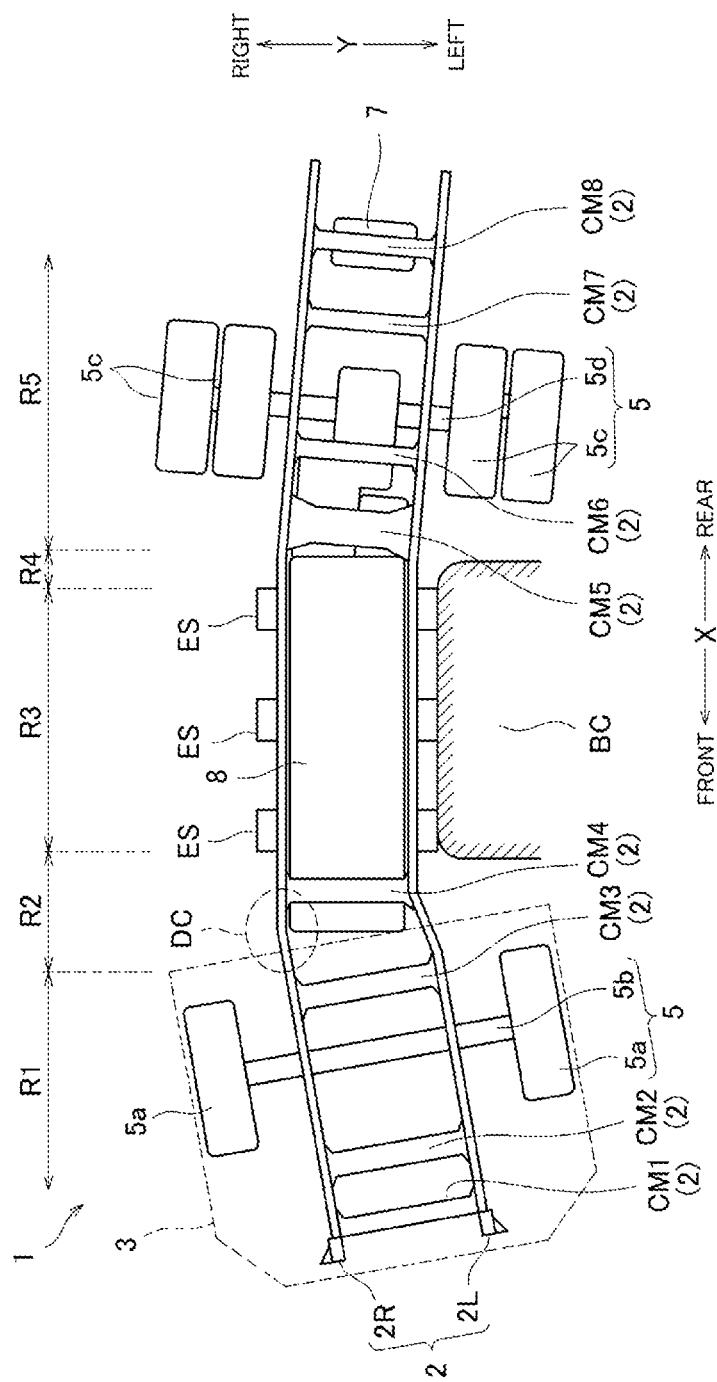
FIG. 4 is a top view showing the electric truck with the ladder frame deformed in a side collision.

Here, how the power supply unit 8 is influenced when the electric truck 1 is struck in a side by another vehicle or the like will be explained. FIG. 4 is a top view showing the electric truck 1 with the ladder frame 2 deformed in a side collision. The cargo box 4 is omitted in the Figure. More specifically, FIG. 4 schematically shows the electric vehicle 1 assuming that another vehicle BC has struck the left side of the electric truck 1 in the vehicle width direction Y in the region of the power supply unit 8, so that the ladder fame 2 has been deformed.

Since the electric truck 1 has relatively high rigidity in the region including the cab 3 and the wheel mechanism 5 including the front axle 5b and the region including the wheel mechanism 5 including the rear axle 5c, indicated as regions R1 and R5 in FIG. 4, the electric truck 1 is not significantly deformed in these regions in a side collision.

More specifically, in region R1, displacement of the ladder frame 2 is limited by frictional force produced between the left and right front wheels 5a and the road surface, and the front axle 5b and the cross-members CM1 to CM3 arranged close to each other reinforce the ladder frame 2. Thus, in region R1, deformation of the ladder frame by side impact is restricted. Likewise, in region R5, displacement of the ladder frame 2 is limited by frictional force produced between the left and right rear wheels 5c and the road surface, and the rear axle 5d and the cross-members CM5 to CM8 arranged close to each other reinforce the ladder frame 2. Thus, in region R5, deformation of the ladder frame 2 by side impact is restricted.

Here, the power supply unit 8, which is connected to the left and right side rails 2L, 2R using the elastic connectors ES2, can fulfill the function of reinforcing the ladder frame like the cross-member. Thus, even when the ladder frame 2 receives side impact in the region corresponding to the power supply unit 8 indicated as region R3, deformation of the side rail in the region receiving impact is restricted.

However, the ladder frame 2 has low rigidity in region R2 between the cab 3 and the elastic connectors ES2 in the front row and region R4 between the elastic connectors ES2 in the rear row and the cross-member CM5, as compared with regions R1, R3 and R5. Thus, if the ladder frame 2 receives impact exceeding its rigidity in a side collision in which the electric truck 1 is struck in the region corresponding to the power supply unit 8, the ladder frame 2 may not be able to withstand the impact and be deformed in regions R2 and R4.

In such case, the power supply unit 8 receives intensive impact from the edge of a flange of the left or right side rail 2L, 2R on the inner side of the deformed ladder frame 2 as viewed in the vehicle width direction Y, which may cause great damage to the enclosed battery 30. Side collision safety may therefore not be able to be ensured.

In this view, in the electric truck 1 according to the present invention, a cutout is provided in the left and right side rails 2L, 2R, as described below, to reduce the possibility of the power supply unit 8 becoming damaged by intensive impact from the side rail in a side collision.

Figure 5:
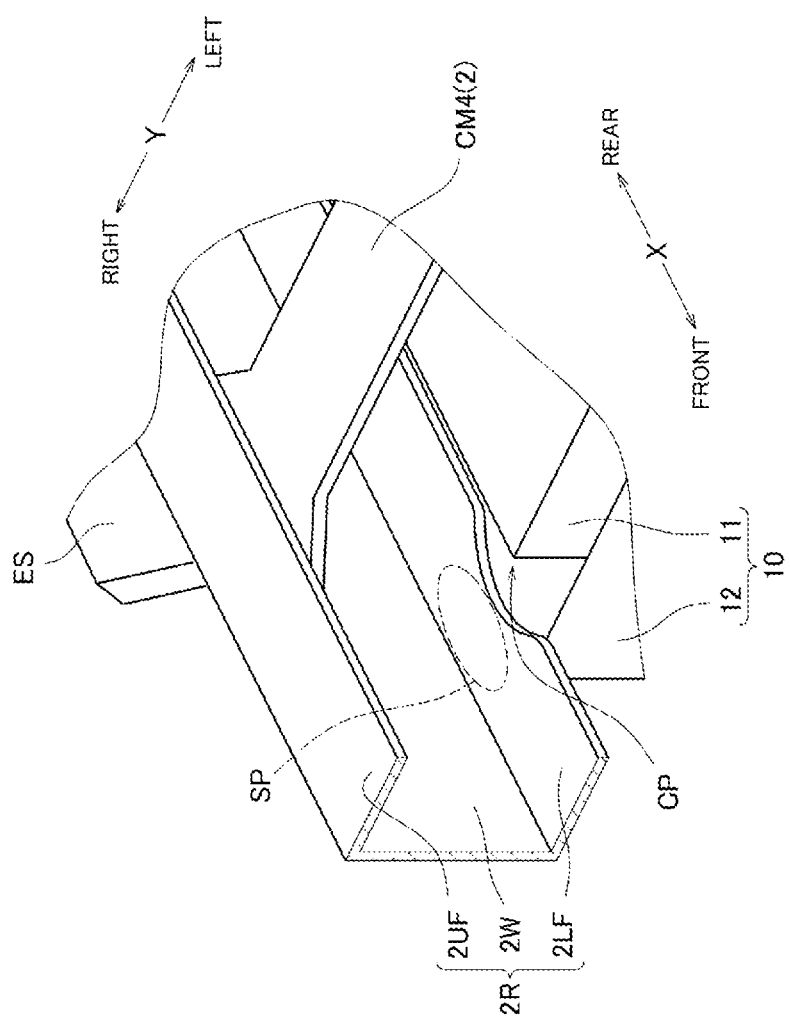
FIG. 5 is a fragmentary enlarged view showing a part of the ladder frame near a corner of the power supply unit.

FIG. 5 is a fragmentary enlarged view showing a part of the ladder frame 2 near a corner of the power supply unit 8. Specifically, FIG. 5 is an enlarged perspective view of the part enclosed by a dashed line in FIG. 4, more specifically a perspective view showing a right front corner CP of the first battery housing portion 11 of the battery housing 10 constituting the power supply unit 8 and the part of the right side rail 2R facing the corner CP, viewed in the vehicle width direction Y from the inside.

Like a side rail in conventional common trucks, the right side rail 2R comprises a web 2W providing a surface perpendicular to the vehicle width direction Y and upper and lower flanges 2UF, 2LF having a predetermined width, provided at the top and bottom edges of the web 2W as viewed in the vehicle height direction Z to project inward in the vehicle width direction Y. The right side rail 2R has thus a C-shaped cross-section. Like the right side rail 2R, the left side rail 2L comprises a web 2W and an upper and a lower flanges 2UF, 2LF.

As shown in FIG. 5, the right side rail 2R has a narrowed flange portion SP having a width smaller than the predetermined width at a location facing the corner CP of the battery housing as viewed in the vehicle width direction Y. The narrowed flange portion SP provides an increased distance between the lower flange 2LF and the corner CP of the battery housing 10. Thus, when the electric truck 1 receives side impact so that the ladder frame 2 is deformed, the possibility of the edge of the lower flange 2LF coming into contact with the corner CP of the battery housing 10 is reduced, so that the risk of the power supply unit 8 becoming damaged is reduced.

Figure 6:
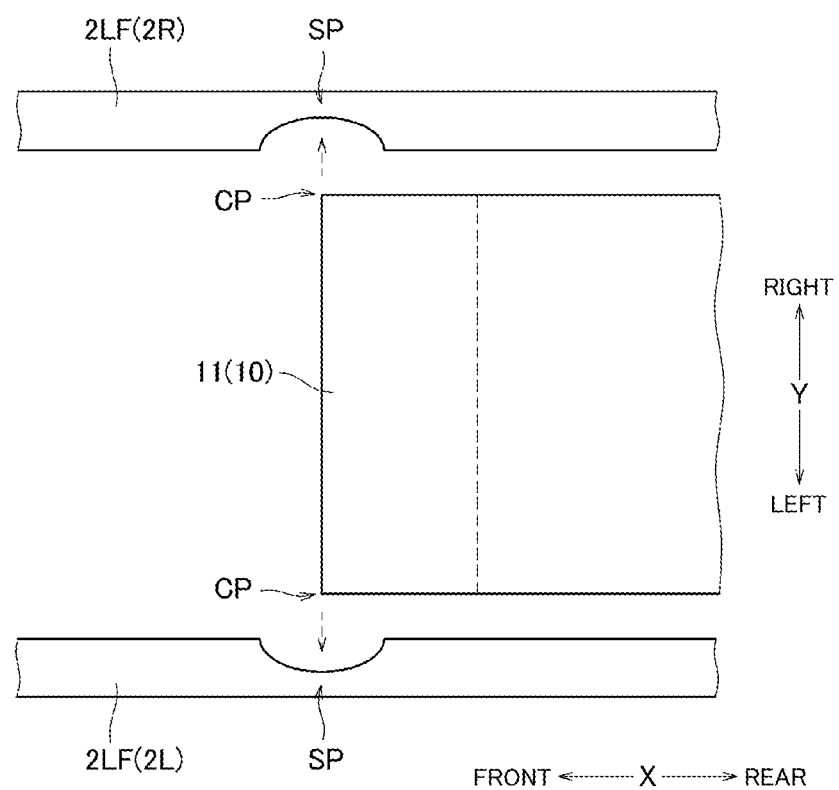
FIG. 6 is a plan view schematically showing the positional relationship between narrowed flange portions of lower flanges and a first battery housing portion of a battery housing.

FIG. 6 is a plan view schematically showing the positional relationship between the narrowed flange portions SP of the lower flanges 2LF and the first battery housing portion 11 of the battery housing 1. In FIG. 6, the boundary between the regions of the first battery housing portion 11 in which the PDU 20 and the battery 30 are arranged respectively is indicated by a dashed line.

As seen in FIG. 6, the left and right side rails 2L, 2R each have a narrowed flange portion SP in the lower flange 2LF, which is provided by a cutout having an arc-shaped outline. This prevents a stress concentration in the narrowed flange portion SP even when force is applied to the frame during traveling of the vehicle by, for example twist or lateral bend of the ladder frame 2 during traveling of the electric truck 2.

Further, the narrowed flange portion SP has the most narrowed point at which the narrowed flange portion has the smallest width, at a location indicated by a dashed-line arrow, and the narrowed flange portion SP is arranged such that the most narrowed point is in alignment with the corresponding corner CP of the battery housing 10 as viewed in the vehicle width direction Y. By this, the risk of the power supply unit 8 becoming damaged by the ladder frame 2 coming into contact with the corner CP of the battery housing 10 is reduced effectively.

Figure 7:
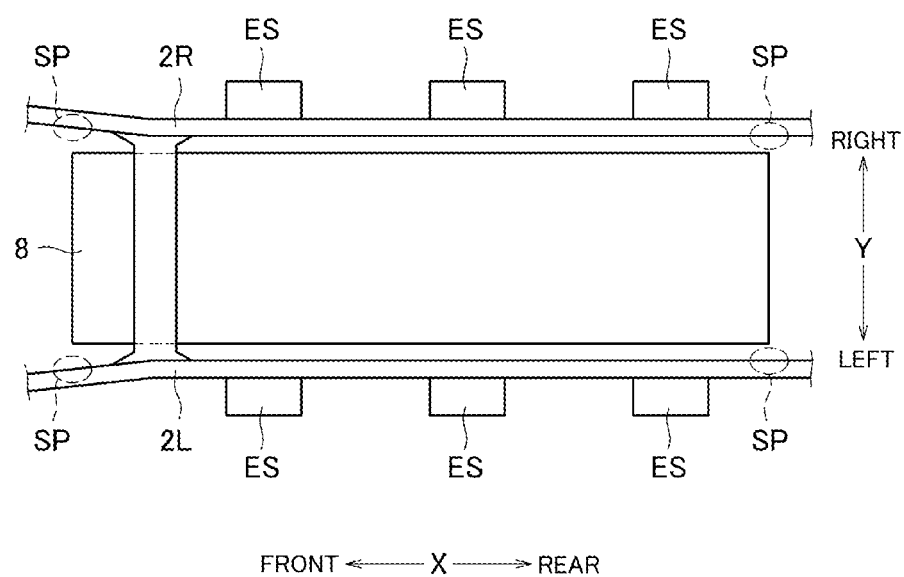
FIG. 7 is a top view showing at what locations narrowed flange portions are provided in the ladder frame.

FIG. 7 is a top view showing at what locations narrowed flange portions SP are provided in the ladder frame 2. More specifically, FIG. 7 is a top view showing the part of the ladder frame 2 surrounding the first battery housing portion 11 of the power supply unit 8.

As shown in FIG. 7, in the present embodiment, narrowed flange portions SP to be provided in the lower flanges 2LF of the left and right side rails 2L, 2R are provided at four locations facing two vehicle front-side corners CP and two vehicle rear-side corners CP of the power supply unit 8. By this, the possibility of the power supply unit 8 becoming damaged by impact from the ladder frame 2 is reduced in regions in which the ladder fame 2 is relatively low in rigidity and easily deformed, such as regions R2, R4 shown in FIG. 4.

As described above, in the electric truck 1 according to the present invention, the ladder frame 2 has lower flanges 2LF each having a narrowed flange portion SP at a location facing a corner CP of the power supply unit 8 to reduce the possibility of the ladder frame 2 coming into contact with the power supply unit 8 even when the left or the right side rail 2L, 2R is deformed. Thus, the electric truck 1 according to the first embodiment of the present invention can reduce the risk of the power supply unit 8 receiving intensive impact from the edge of the lower flange 2LF, and thus, ensure the side collision safety of the battery 30 arranged inside the frame.

Second Embodiment

Next, a second embodiment of the present invention will be described. The electric truck 1 according to the second embodiment differs from the first embodiment in the configuration of the power supply unit 8 and the locations of the narrowed flange portions SP. The difference from the first embodiment will be described below. The components common to the first and second embodiments are given the same reference signs; the detailed description thereof will be omitted.

Figure 8:
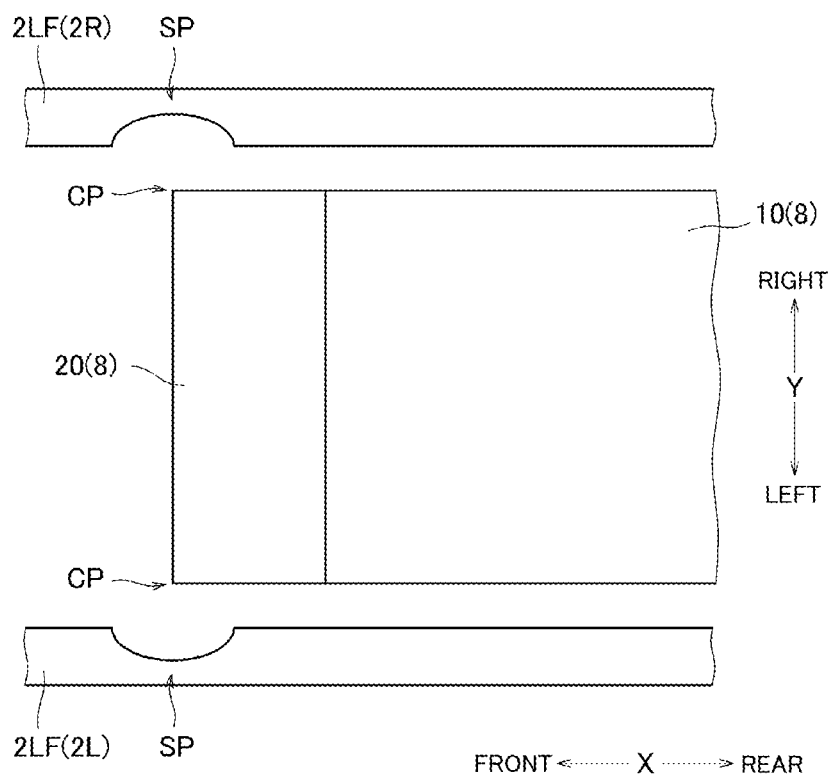
FIG. 8 is a plan view schematically showing the positional relationship between lower flanges of a ladder frame and a power supply unit in a second embodiment of the present invention.

FIG. 8 is a plan view schematically showing the positional relationship between the lower flanges 2LF of the ladder frame 2 and the power supply unit 8 in the second embodiment of the present invention. In the second embodiment, the PDU 20 is arranged in front of the front surface of the battery housing 10 enclosing the battery 30 (not shown in FIG. 8) as viewed in the vehicle longitudinal direction X. Specifically, in the second embodiment, the PDU 20 is arranged outside the battery housing 10 to be in contact with the front surface of the battery housing 10.

In this configuration, front corners CP of the power supply unit 8 are front corners of the PDU 20, not corners of the battery housing 10. The lower flanges 2LF of the ladder frame 2 have therefore narrowed flange portions SP at the locations facing the front corners of the PDU 20. Thus, also the second embodiment of the present invention in which the power supply unit 8 is configured to have the PDU 20 arranged outside the battery housing 10 can reduce the risk of the power supply unit 8 becoming damaged by impact from the ladder frame 2.

Third Embodiment

Next, a third embodiment of the present invention will be described. The electric truck 1 according to the third embodiment differs from the second embodiment in the configuration of the power supply unit 8 and the locations of the narrowed flange portions SP. The difference from the second embodiment will be described below. The components common to the second and third embodiments are given the same reference signs; the detailed description thereof will be omitted.

Figure 9:
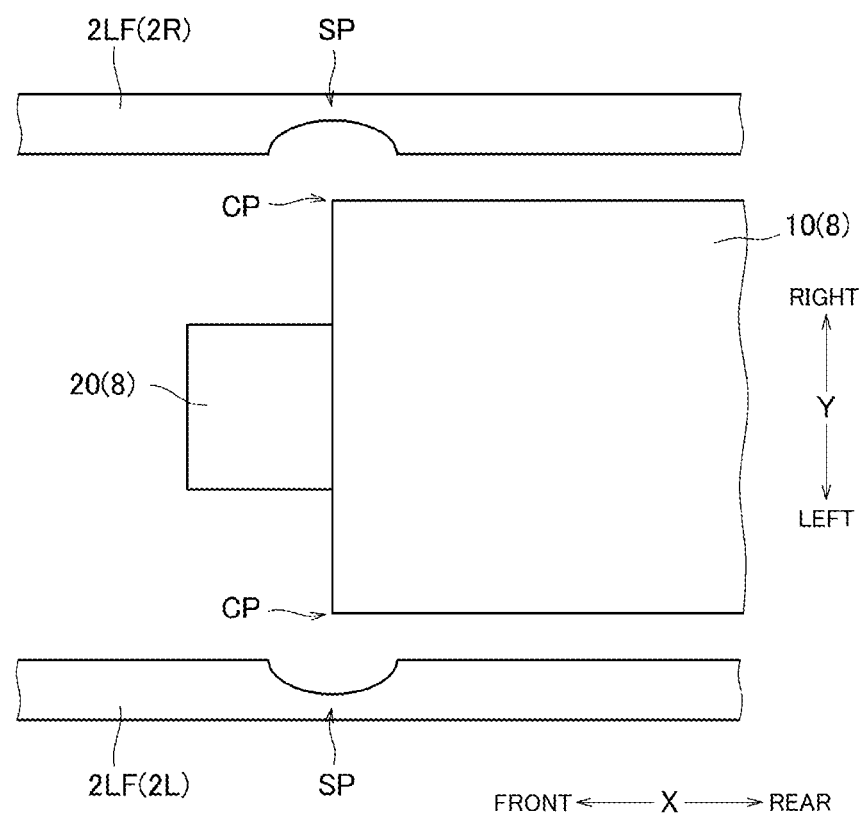
FIG. 9 is a plan view schematically showing the positional relationship between lower flanges of a ladder frame and a power supply unit in a third embodiment of the present invention.

FIG. 9 is a plan view schematically showing the positional relationship between the lower flanges 2LF of the ladder frame 2 and the power supply unit 8 in the third embodiment of the present invention. In the third embodiment, the power supply unit 8 has a PDU 20 arranged outside the battery housing 10 to be in contact with the front surface of the battery housing 10, as in the second embodiment. However, in the third embodiment, the dimension of the PDU 20 measured in the vehicle width direction Y is smaller than that of the battery housing 10.

In this configuration, if the ladder frame 2 is deformed in region R2 when the electric truck 1 receives side impact, the lower flange 2LF of the ladder frame 2 may come into contact with the power supply unit 8 at the corresponding corner CP of the battery housing 10. In the third embodiment, the lower flanges 2LF of the ladder frame 2LF have therefore narrowed flange portions SP at the locations facing corners CP of the battery housing 10.

Fourth Embodiment

Next, a fourth embodiment of the present invention will be described. The electric truck 1 according to the fourth embodiment differs from the second embodiment in the configuration of the power supply unit 8 and the locations of the narrowed flange portions SP. The difference from the second embodiment will be described below. The components common to the second and fourth embodiments are given the same reference signs; the detailed description thereof will be omitted.

Figure 10:
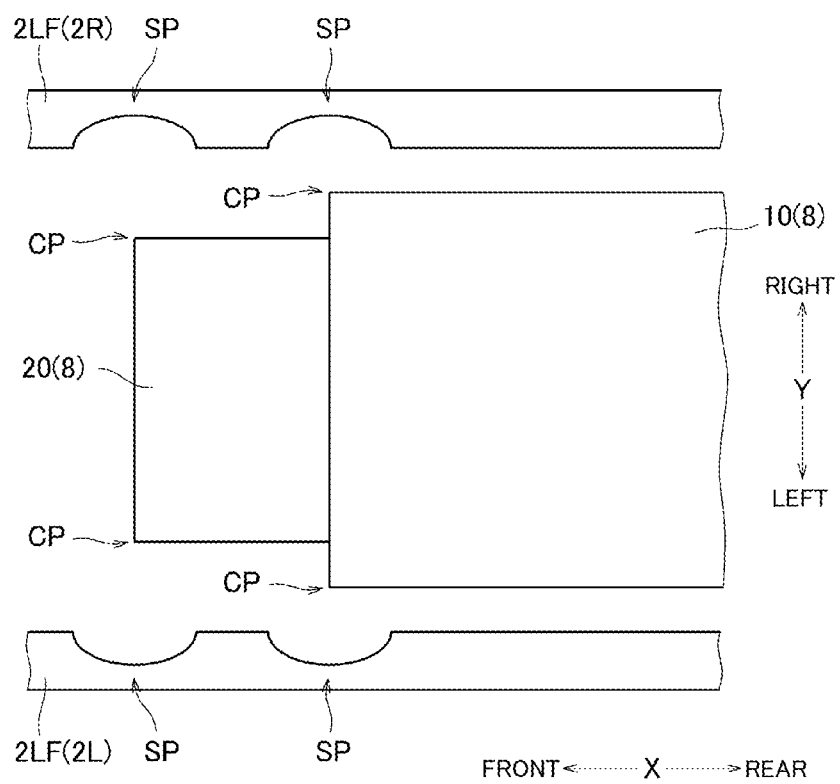
FIG. 10 is a plan view schematically showing the positional relationship between lower flanges of a ladder frame and a power supply unit in a fourth embodiment of the present invention.

FIG. 10 is a plan view schematically showing the positional relationship between the lower flanges 2LF of the ladder frame 2 and the power supply unit 8 in the fourth embodiment of the present invention. In the fourth embodiment, the power supply unit 8 has a PDU 20 arranged outside the battery housing 10 to be in contact with the front surface of the battery housing 10, as in the second embodiment. However, in the fourth embodiment, the dimension of the PDU 20 measured in the vehicle width direction Y is smaller than that of the battery housing 10 but great as compared with the third embodiment.

In this configuration, if the ladder frame 2 is deformed in region R2 when the electric truck 1 receives side impact, the lower flange 2LF of the ladder frame 2 may come into contact with the power supply unit 8 at the corresponding corner CP of the battery housing 10 and at the corresponding corner CP of the PDU 20. In the fourth embodiment, the lower flanges 2LF of the ladder frame 2LF have therefore narrowed flange portions at the locations facing corners CP of the battery housing 10 and corners CP of the PDU 20.

Fifth Embodiment

Next, a fifth embodiment of the present invention will be described. The electric truck 1 according to the fifth embodiment differs from the first embodiment in the shape of the battery housing 10 and the support structure for the power supply unit 8. The difference from the first embodiment will be described below. The components common to the first and fifth embodiments are given the same reference signs; the detailed description thereof will be omitted.

Figure 11:
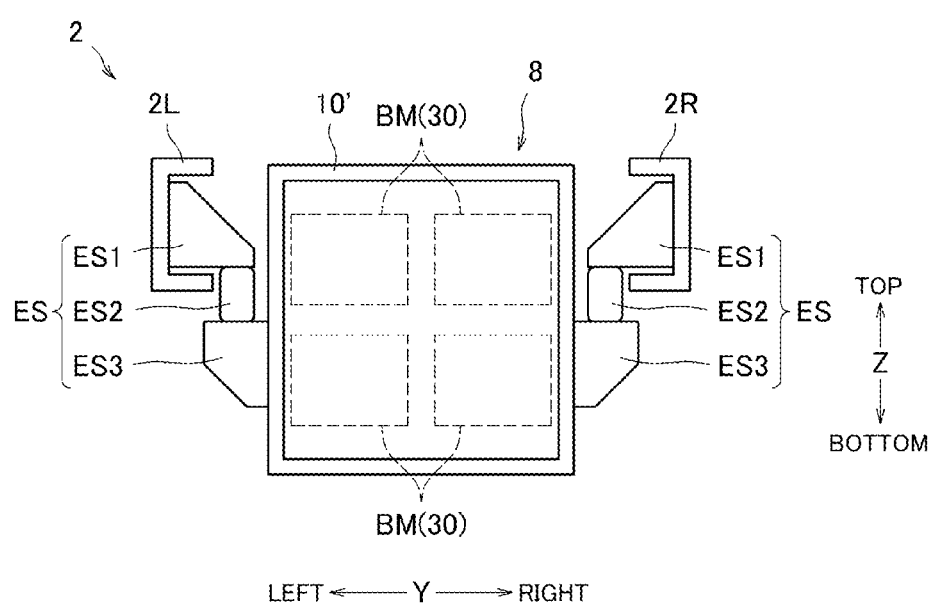
FIG. 11 is a cross-sectional view showing the configuration and connecting manner of an elastic support for connecting a power supply unit to a ladder frame.

FIG. 11 is a cross-sectional view showing the configuration and connecting manner of the elastic support ES for connecting the power supply unit 8 to the ladder frame 2. More specifically, FIG. 11 is a cross-sectional view showing the cross-sections of the power supply unit 8 and the elastic support ES perpendicular to the vehicle longitudinal direction X viewed from the rear of the vehicle.

In the fifth embodiment, the power supply unit 8 has a battery housing 10' in the shape of a rectangular solid, where the whole housing is located on the inner side of the left side rail 2L and on the inner side of the right side rail 2R as viewed in the vehicle width direction Y.

In the fifth embodiment, the elastic support ES has a frame-side bracket ES1 attached to the inner side of the left or right side rail 2L, 2R and a battery-side bracket ES3 attached to the side surface of the power supply unit 8.

In the fifth embodiment in which the power supply unit 8 is in the shape of a rectangular solid, narrowed flange portions SP are provided in the lower flanges 2LF of the ladder frame 2 in the same as in the first embodiment. By this, the possibility of the power supply unit 8 becoming damaged by contact between the ladder frame 2 and the battery housing 10' is reduced.

REFERENCE SIGNS LIST

1 Electric truck
2 Ladder frame
2L Left side rail
2R Right side rail
2W Web
2UF Upper flange
2LF Lower flange
8 Power supply unit
10 Battery housing
20 PDU
30 Battery
CP Corner
SP Narrowed flange portion

The invention claimed is:

1. An electric truck that travels by electric power supplied from a battery, comprising:
   a ladder frame including a pair of side rails, wherein the side rails face each other in a vehicle width direction; and
   a power supply unit including the battery, wherein the power supply unit is disposed between the side rails and is connected to the side rails;
   wherein the side rails each have flanges having a predetermined width provided at each edge of a respective web;
   wherein a first one of the flanges at a first location facing a first corner of the power supply unit as viewed in the vehicle width direction has a first narrowed flange portion having a width smaller than the predetermined width.

2. The electric truck according to claim 1, wherein a second one of the flanges at a second location facing a second corner of the power supply unit as viewed in the vehicle width direction has a second narrowed flange portion having the width smaller than the predetermined width.

3. The electric truck according to claim 2, wherein the first corner and the second corner of the power supply unit are vehicle front-side corners of the power supply unit.

4. The electric truck according to claim 2, wherein the first corner and the second corner of the power supply unit are vehicle rear-side corners of the power supply unit.

5. The electric truck according to claim 1, wherein the first narrowed flange portion has an arc-shaped outline.

6. The electric truck according to claim 1, wherein a most narrowed point at which the first narrowed flange portion has a smallest width is in alignment with the first corner of the power supply unit as viewed in the vehicle width direction.

* * * * *